(12) United States Patent
Hämäläinen et al.

(10) Patent No.: US 8,719,391 B2
(45) Date of Patent: May 6, 2014

(54) METHOD AND SYSTEM FOR CONTROLLING CONTEXTUAL INFORMATION PUSH SERVICES

(75) Inventors: Mikko Hämäläinen, Helsinki (FI);
Timo Helander, Espoo (FI)

(73) Assignee: Nokia Corporation, Espoo (FI)

( * ) Notice: Subject to any disclaimer, the term of this patent is extended or adjusted under 35 U.S.C. 154(b) by 2396 days.

(21) Appl. No.: 11/368,395

(22) Filed: Mar. 7, 2006

(65) Prior Publication Data
US 2007/0214245 A1    Sep. 13, 2007

(51) Int. Cl.
*G06F 15/173*    (2006.01)

(52) U.S. Cl.
USPC ................................................. 709/223

(58) Field of Classification Search
USPC ................................................. 709/223
See application file for complete search history.

(56) References Cited

U.S. PATENT DOCUMENTS

| | | | |
|---|---|---|---|
| 4,656,463 A | 4/1987 | Anders et al. | |
| 6,226,274 B1* | 5/2001 | Reese et al. | 370/280 |
| 7,103,313 B2* | 9/2006 | Heinonen et al. | 455/41.2 |
| 7,765,264 B2* | 7/2010 | Cunningham et al. | 709/206 |
| 2002/0022453 A1 | 2/2002 | Balog et al. | |
| 2002/0077083 A1 | 6/2002 | Zellner et al. | |
| 2002/0118118 A1 | 8/2002 | Myllymaki et al. | |
| 2003/0043073 A1* | 3/2003 | Gray et al. | 342/465 |
| 2005/0083929 A1* | 4/2005 | Salo et al. | 370/389 |
| 2005/0119012 A1* | 6/2005 | Merheb et al. | 455/456.3 |
| 2005/0201320 A1* | 9/2005 | Kiss et al. | 370/328 |
| 2005/0210114 A1 | 9/2005 | Washburn | |
| 2005/0233733 A1* | 10/2005 | Roundtree et al. | 455/414.1 |
| 2006/0258338 A1* | 11/2006 | Markki et al. | 455/414.1 |

(Continued)

FOREIGN PATENT DOCUMENTS

| | | |
|---|---|---|
| EP | 1 274 264 A1 | 1/2003 |
| EP | 1274264 A1 | 1/2003 |
| WO | WO 02/07474 A1 | 1/2002 |
| WO | WO 2005/039146 A2 | 4/2005 |

OTHER PUBLICATIONS

Imielinski et al., "Mobile Wireless Computing", Communications of the ACM, Oct. 1994, vol. 37, No. 10, pp. 19-28.

(Continued)

*Primary Examiner* — Krista Zele
*Assistant Examiner* — Tariq Najee-Ullah
(74) *Attorney, Agent, or Firm* — Ditthavong Mori & Steiner, P.C.

(57) ABSTRACT

A system, server, method, and computer program product are disclosed for facilitating the creation of push messages pertaining to context dependent services and managing their delivery to mobile wireless devices having diverse routing, scheduling, and context or event-triggering requirements. A web-based interface is presented on an administrator console for defining profiles specifying content delivery characteristics for a plurality of mobile wireless devices. The profiles can include a recipient characteristic, a message delivery mode characteristic, and a bearer characteristic. A Service Manager is coupled to the web-based interface and to a plurality of access points, for pushing a message via a specified bearer, using a specified delivery mode, to one of the plurality of mobile wireless devices of a specified recipient satisfying one of the defined profiles of content delivery characteristics when the one device is located within a coverage area of one of the plurality of access points.

22 Claims, 6 Drawing Sheets

(56) References Cited

U.S. PATENT DOCUMENTS

| | | | |
|---|---|---|---|
| 2007/0143779 A1* | 6/2007 | Kaarela et al. | 725/25 |
| 2007/0149214 A1* | 6/2007 | Walsh et al. | 455/456.1 |
| 2007/0191100 A1* | 8/2007 | Counts | 463/42 |

OTHER PUBLICATIONS

Kenward, "Mobile Data Communications: The Future is in Networks", 1992, pp. 48-51.

Weiss et al., "Conventional Local Area Radio Coverage System", Motorola Inc., Technical Developments, vol. 13, Jul. 1991, pp. 67-69.

Buchholz et al., "Wireless In-Building Network Architecture and Protocols", 1992, pp. 1025-1031.

Freeburg, "Enabling Technologies for Wireless In-Building Network Communications—Four Technical Challenges, Four Solutions", IEEE Communications Magazine, Apr. 1991, pp. 58-64.

European Office action for corresponding EP Appln. No. 07733910.9-2416 dated Jul. 28, 2010, pp. 1-6.

European search report for corresponding EP Appln. No. 07733910.9-2416 dated Jul. 15, 2010, pp. 1-3.

User Experiences on Combining Location Sensitive Mobile Phone Applications and Multimedia Mesaging, Hakkila et al, Int. Conf. on Mobile and Ubiquitous Multimedia, ACM, Oct. 27, 2994, pp. 179-185.

* cited by examiner

WEB-BASED INTERFACE
400

ADMIN. CONSOLE 175

Channel Details: Static text

Name: Static text
Enabled: ☑
Primary bearer: Local SMS  Timeout (min) 10  Retry interval (sec) 60
From: Help desk
Subject: Welcome visitor
Source type: ⦿ Text ◯ URL ◯ RSS
Content text: Welcome to building X. The help desk is located on second floor, room 123.
Trigger: MD join
Occurence: ⦿ Once ◯ Always ◯ Content updated (Ok) (Close) (Apply)

FIG. 5

Channel Details: <New Channel>

- Name: Dynamic text
- Enabled: ☒
- Primary bearer: Local SMS  Timeout (min): 10  Retry interval (sec): 60
- From: Security Team
- Subject: Security Alert
- Source type: ○ Text  ● URL  ○ RSS
- Content URL: http://intranet.com/security/latestalert
- URL polling period: 10 minutes
- XSL Stylesheet:
- Trigger: Content updated
- Occurrence: ● Instant  ○ Interval
- User status: ○ Any  ● Online  ○ Offline (Ok) (Close) (Apply)

ADMIN. CONSOLE 175

WEB-BASED INTERFACE 400'

FIG. 6

Channel Details: Digest text

- Name: Digest text
- Enabled: ☑
- Primary bearer: Local SMS — Timeout (min) 10 — Retry interval (sec) 60
- From: News Service
- Subject: Latest Headlines
- Source type: ○ Text ◉ URL ○ RSS
- Content URL: http://newsservice.com/latestnews
- URL polling period: 10 minutes
- XSL Stylesheet:
- Trigger: Content updated
- Occurrence: ○ Instant ◉ Interval
- Message Interval: 240 minutes
- User status: ○ Any ◉ Online ○ Offline (Ok) (Close) (Apply)

WEB-BASED INTERFACE 400"
ADMIN. CONSOLE 175

METHOD AND SYSTEM FOR CONTROLLING CONTEXTUAL INFORMATION PUSH SERVICES

FIELD OF THE INVENTION

The invention disclosed broadly relates to context-dependent services for mobile terminals and more particularly relates to facilitating the creation of push messages pertaining to context dependent services and managing their delivery to mobile wireless devices having diverse routing, scheduling, and context or event-triggering requirements.

BACKGROUND OF THE INVENTION

Contextual information push service systems can involve a large set of attributes to control their service operations. System complexity is unavoidable where there are many types of service messages that need to be provided based on diverse routing, scheduling, and context or event-triggering requirements. From the end-users' point of view, the service must be accurate, easy to use, and non-intrusive. From the system administrator's point of view, the system complexity needs to be hidden so that the administrator can easily specify push messages pertaining to context dependent services and easily manage their delivery to a large population of mobile wireless devices.

What is needed in the prior art is an improved system and method to facilitate the creation of push messages pertaining to context dependent services and to manage their delivery to mobile wireless devices having diverse routing, scheduling, and context or event-triggering requirements.

SUMMARY OF THE INVENTION

A system, server, method, and computer program product are disclosed for facilitating the creation of push messages pertaining to context dependent services and managing their delivery to mobile wireless devices having diverse routing, scheduling, and context or event-triggering requirements.

In one aspect of the invention, a web-based interface is presented on an administrator console for defining profiles specifying content delivery characteristics for a plurality of mobile wireless devices. The profiles can include a recipient characteristic, a message delivery mode characteristic, and a bearer characteristic. A Service Manager is coupled to the web-based interface and to a plurality of access points, for pushing a message via a specified bearer, using a specified delivery mode, to one of the plurality of mobile wireless devices of a specified recipient satisfying one of the defined profiles of content delivery characteristics when the one device is located within a coverage area of one of the plurality of access points.

In another aspect of the invention, a web-based user interface is provided for an administrator to facilitate the creation and management of push messages to mobile wireless devices pertaining to context dependent services. An administrator can log onto the system's management console using a web browser and with the user interface, can perform management operations for the system. In another aspect of the invention, the push messages thus specified by the administrator are managed in their delivery to mobile wireless devices having diverse routing, scheduling, and event-triggering requirements.

The service profile prepared by the system administrator on the console using the web-based interface can specify Information Push message delivery formats, such as Short Messaging Service (SMS) messages, Multimedia Messaging Service (MMS) messages, emails, and the like. The service profile can specify scheduled delivery or delivery triggered by certain specified events. The service profile can specify delivery to the mobile device using a short-range wireless access point or optionally a GSM, GPRS, or 3G telephone network. Additionally, the service profile can specify backup delivery channels if the specified primary channel fails to send the user the push message.

In another aspect of the invention, a service manager server manages the delivery of push messages to mobile wireless devices having diverse routing, scheduling, and context or event-triggering requirements. The service manager server includes a service profile server for storing a plurality of service profiles of content delivery characteristics. The profiles each specify a bearer, using a specified delivery mode, for pushing a message to one of a plurality of mobile wireless devices of a specified recipient satisfying one of the plurality of service profiles when the one mobile wireless device is located within a coverage area of one of a plurality of access points. The service manager server also includes a content aggregation logic coupled to the service profile server, for polling web servers identified by a content characteristic in a service profile, accessing content from the web servers, and storing the content in a content queue. The service manager server also includes a service logic coupled to the content aggregation logic, the content queue, and the service profile server, for receiving a notification that content has been accessed and handling the accessed content in accordance with the service profiles in the service profile server. The service manager server also includes a context state logic coupled to the service logic and to the plurality of access points, for maintaining context information about the plurality of mobile wireless devices, including whether a specified mobile device can be reached over a communications link. The service manager server further includes a messaging logic coupled to the context state logic for selecting a specified primary bearer to send the push message to the specified mobile device if the specified mobile device can be reached over the primary bearer.

In an example of one aspect of the invention, Short Messaging Service (SMS) based news service messages can be created with the administrator's web-based user interface to send the latest headlines once a day to a number of mobile wireless device users who have subscribed the service. The service can collect the news information from a plurality of sources and send it over SMS appropriately formatted to each of the subscribers, having diverse routing, scheduling, and context or event-triggering requirements for delivery. The information push service is performed for each subscriber when the subscriber's mobile device has a pre-specified context specified by the administrator's user interface, i.e., the message is sent only when certain conditions are met. Example of pre-specified context conditions specified by the administrator's web-based user interface can include either absolute location or "location class" of the mobile wireless device. The absolute location can be known with the granularity of a Wireless LAN or Bluetooth access point communications range, as for example, "Building in the address X, third floor, block A". Various absolute locations can be grouped by their class, for example, one location class can be "meeting rooms", another "office space", and a third "home". Other example pre-specified context conditions specified by the administrator's web-based user interface can include contextual services being assigned to certain users or groups of users. The delivery of the service messages can to be triggered when a certain user or member of a user group appears in a certain location or location class.

The resulting invention solves the problem of facilitating the creation of push messages pertaining to context dependent services and managing their delivery to mobile wireless devices having diverse routing, scheduling, and context or event-triggering requirements.

DISCUSSION OF THE PREFERRED EMBODIMENT

Figure 1:
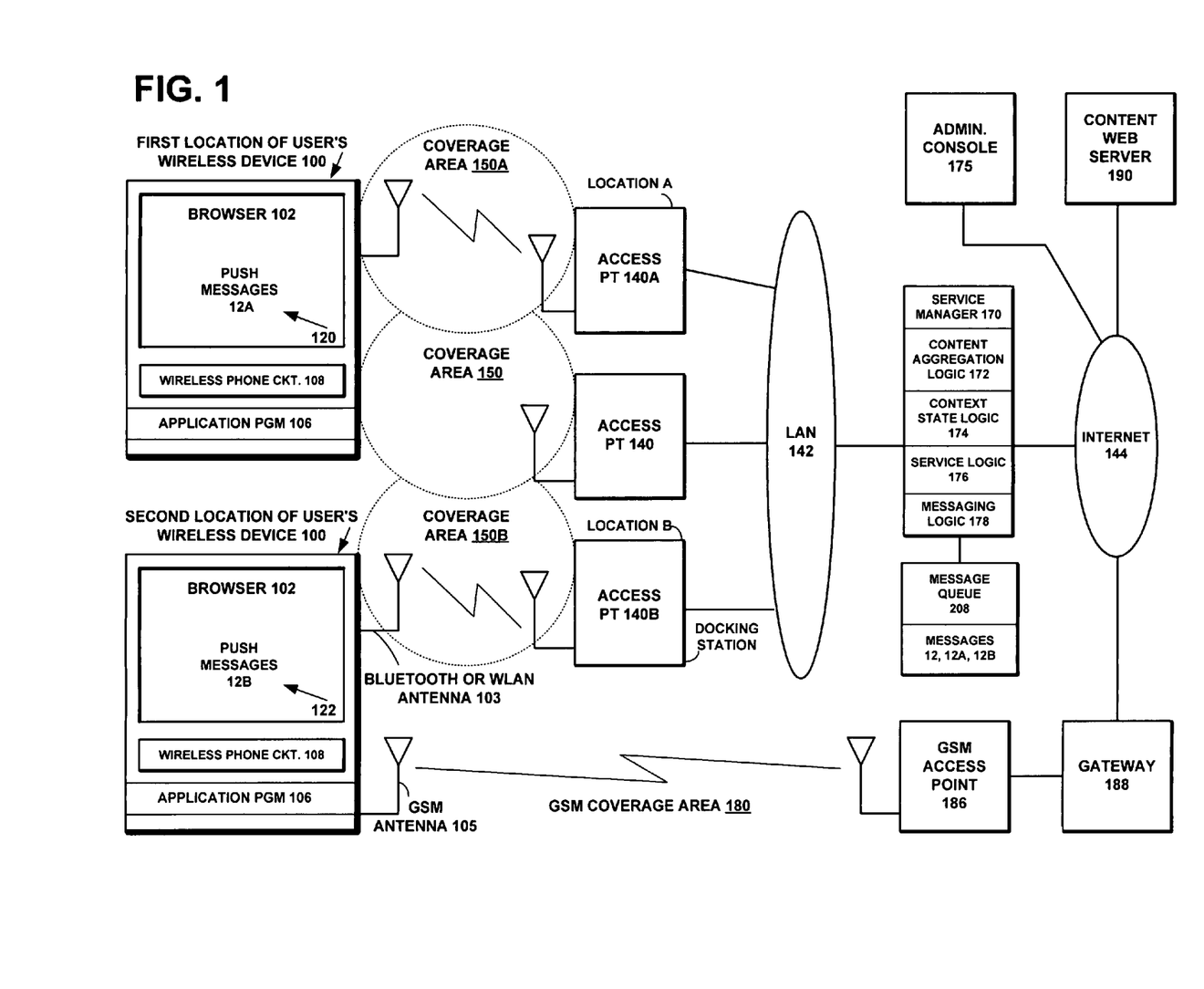
FIG. 1 is a network diagram according to an embodiment of the present invention.

FIG. 1 is a network diagram according to an embodiment of the present invention, showing a plurality of short-range wireless access points 140, 140A, and 140B connected to the local area network (LAN) 142. Each respective access point 140, 140A, and 140B has a corresponding coverage area 150, 150A, and 150B, respectively. The short-range wireless access points can be, for example, Bluetooth wireless devices, IEEE 802.11 Wireless LAN devices, HIPERLAN Wireless LAN devices, Ultra Wideband (UWB) radio Wireless LAN devices, or IrDA devices. Bluetooth wireless devices have a typical coverage area of a radius of 10 meters. IEEE 802.11 Wireless LAN devices and HIPERLAN Wireless LAN devices have a typical coverage area with a radius of 100 meters.

The LAN 142 of FIG. 1 interconnects the access points with the Service Manager 170, which in turn is connected to the Internet 144. The Internet 144 is connected to the telephone network gateway 188, which in turn is connected to a wireless telecommunication access point, such as the GSM access point 186. The GSM access point 186 is typically a base station transponder mounted on a tower or building, with a coverage area 180 ranging from city blocks to kilometers.

The user's wireless device 100 in FIG. 1 includes short-range wireless communications circuits using, for example, the Bluetooth protocol, IEEE 802.11 Wireless LAN protocol, HIPERLAN Wireless LAN protocol, Ultra Wideband (UWB) radio Wireless LAN protocol, or IrDA protocol. The user's wireless device 100 includes a Bluetooth or Wireless LAN (WLAN) antenna 103. The user's wireless device 100 also includes a wireless telephone circuit 108 and an antenna 105, such as a GSM circuit and antenna. The user's wireless device 100 includes the microbrowser 102, a key pad, and an application program 106. The user's wireless device 100 may be such as a mobile phone, a wireless communication device, a PDA, a portable audio device, a portable TV device, a digital camera, a digital camcorder, a wrist watch, a GPS device, or any combination of the aforesaid devices. Depending on the device, the content sent by the system may be different. In one embodiment activating of the device may be via rfid. The user may have an id card or an id badge. Touching an rfid reader integrated in the mobile handset may activate one or more of the air interfaces available to the device. The service can then be made available to the user via e.g., short range coverage. The user may have his own icon for the service. The service may be shown active or non-active on the display of the mobile handset.

The local area network (LAN) 142 interconnects the access points with the Service Manager 170, which in turn is connected to the message queue 208 buffering push messages 12, 12A, and 12B. The user's wireless device 100 is shown at a first location A, where it is detected to be within the short-range coverage area of the first wireless access point 140A, which triggers the Service Manager 170 to push message 12A, for example, as a Short Message Service (SMS) like text message via the short-range wireless access point 140A or a chain of text-like messages, Then, at a later time, the device 100 is shown at a second location B, where it is detected to be within the short-range coverage area of the second wireless access point 140B, which triggers the Service Manager 170 to push message 12B, for example, as a Multimedia Messaging Service (MMS)-like image message via the short-range wireless access points 140B or as a chain of multimedia messages to form a cartoon type experience, e.g. a Donald Duck cartoon in image or video format with some speech. For example, the service may be updated from time to time, e.g. the web page, and based on that new content, the user will be receiving updates from this same web page or the like source. The Service Manager 170 could have alternately chosen to push the messages 12A and 12B to the user's wireless device 100 over the GSM network from GSM access point 186.

The Service Manager 170 pushes content, e.g. the messages 12A and 12B to the user's wireless device 100 based on the characteristics of the context of the device 100 at the respective access points 140A and 140B. The characteristics of the contexts that trigger the Service Manager 170 to push messages 12A and 12B to device 100 are specified by a service profile prepared by the system administrator on the console 175 using e.g. the web-based interface 400, 400', or 400" shown in FIGS. 4, 5, and 6, respectively.

The service profile prepared by the system administrator on the console 175 using the web-based interface 400, 400', or 400" can specify Information Push content and message delivery formats e.g. SMS messages including text and binary messages (for example WAP Push messages), MMS messages, emails, IP data stream or files such as audio, video and/or data content e.g. via FTP or DVB-H, etc. The service profile can specify scheduled delivery or delivery triggered by certain specified events. The service profile can specify delivery to the mobile device 100 using the short-range wireless access point 140 or optionally the wireless telecommunication, such as GSM, GPRS, or 3G telephone network. Additionally, the service profile can specify backup delivery channels if the specified primary channel fails to send the user the push content or message. Further, the system administrator can itself create ad hoc Information Push content and messages.

The Service Manager 170 in FIG. 1 includes Content Aggregation Logic 172, Context State Logic 174, Service Logic 176, and Messaging Logic 178. A more detailed system diagram of the components of the Service Manager 170 is shown in FIG. 2.

Figure 2:
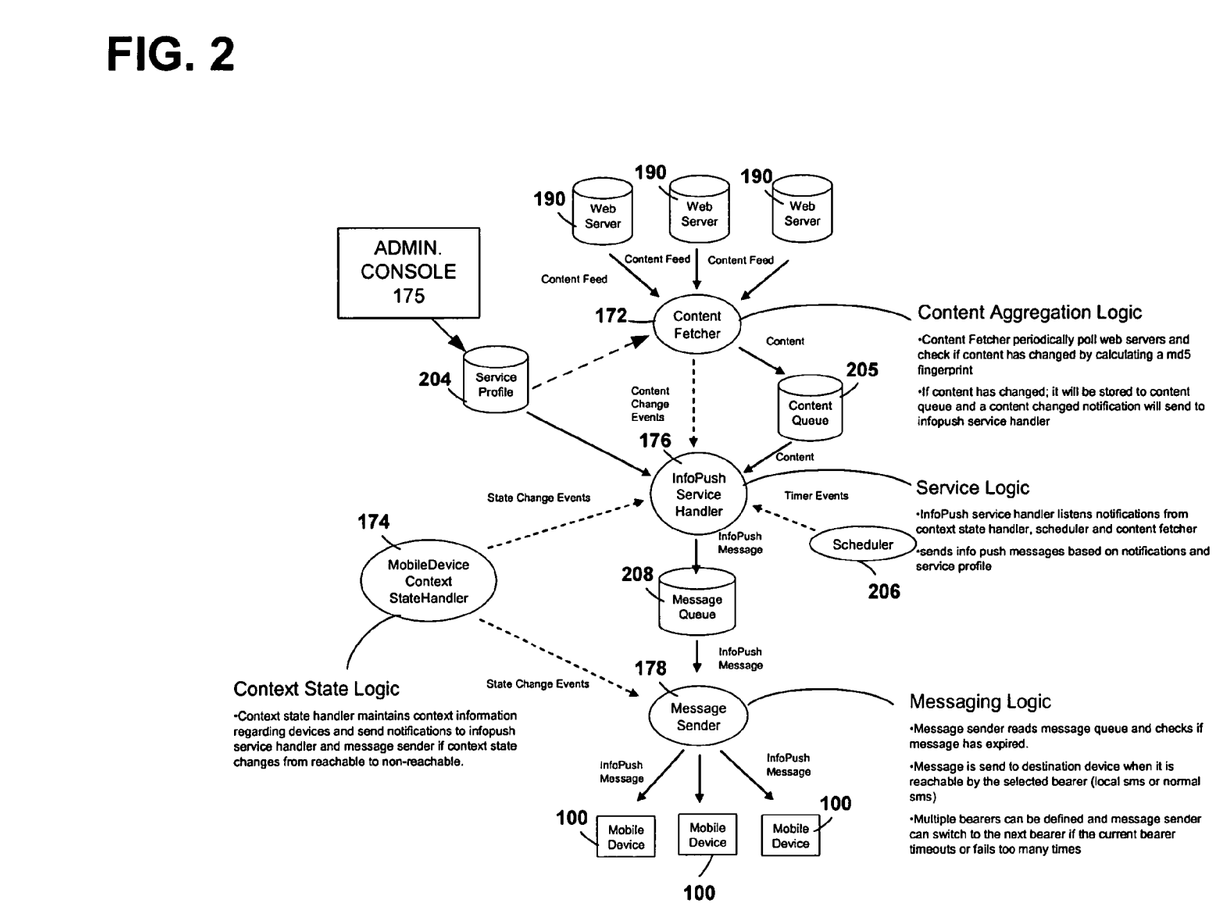
FIG. 2 is a more detailed network diagram according to an embodiment of the present invention.

The Content Aggregation Logic 172, also referred to herein as the Content Fetcher 172 in FIG. 2, in one embodiment of the present invention, periodically polls content servers 190, such as web servers, and checks if content specified by the administrator's web-based console 175 has changed. The web servers 190 and specification of content are defined by the service profile in the Service Profile Server 204. If the content has changed, it will be stored to the Content Queue 205 and a content changed notification will be sent to the Service Logic 176, also referred to as the InfoPush Service Handler 176.

The Context State Logic 174, also referred to herein as the Context State Handler 174 in FIG. 2, maintains context information about the mobile devices 100 in the network. Context information includes the location of a mobile device 100 within the coverage area of an access point 140, and/or the availability or reachability and/or device presence information of the mobile device 100 via the network. The Context State Handler 174 sends notifications to the InfoPush Service Handler 176 and Messaging Logic 178, also referred to herein as the Message Sender 178, if the context state of a mobile wireless device 100 changes, e.g. from a non-reachable state to a reachable state, or from the coverage area of a first access point 140A to that of a second access point 140B or changes in other presence information.

The following states are examples of availability/reachability information handled by the Context State Handler 174:
  LOST—indicates that the device 100 is not in the coverage area of any access point 140.
  FOUND—indicates that the device 100 is found.
  ASSIGNED—indicates that the device 100 is in the process of joining the coverage area of an access point 140.
  JOINED—indicates that the device 100 has joined an access point 140 and is reachable.
  ROAMING—indicates that the device 100 is temporarily out of coverage by any access point.
  ERROR—indicates that the connection to the mobile device 100 has failed after several attempts. The connection to the device 100 will retried after a predetermined timeout has occurred.

The Service Logic 176, also referred to as the InfoPush Service Handler 176 in FIG. 2, listens to notifications from Context State Handler 174, the Scheduler 206, and the Content Fetcher 172. The InfoPush Service Handler 176 sends information push messages based on notifications and Service Profile Server 204.

The Scheduler 206 in FIG. 2 describes scheduled notifications or action requests that are based on a programmable timer or a calendar.

The Service Profile Server 204 in FIG. 2 stores the collection of service profiles prepared by the administrator on the console 175 using e.g. the web-based interfaces 400, 400', or 400" for individual user devices 100 or groups of user devices 100. The Service Profile Server 204 defines the type of content (e.g. content source or defined messages) of services, the name of services, the subject of services, the update or occurrence intervals and/or context, the preferable bearer and/or access point 140 or points, and alternate bearers that are to be used.

The Messaging Logic 178, also referred to herein as the Message Sender 178 in FIG. 2, reads the created messages in message queue 208 and checks if a previously defined information push Message has been sent, and if not then whether the Message expired. The Message is sent to a destination mobile device 100 when it is reachable by a selected bearer and/or access point 140. Multiple bearers or access points 140 can be defined and Message Sender 178 can switch to the next bearer or access point 140 if the current bearer times out or fails too many times.

Messages sent in case of Bluetooth and WLAN (if needed)
Example 1*OS.MDFOUND.EVENT
This is used by the Service Point when it has discovered a new mobile device
Example for WLAN
OS.MDFOUND.EVENT 2@wrap42 OSTP/2.0
Device:WL-00:E0:03:35:47:E9
BSSID:001122334455
Example for Bluetooth
OS.MDFOUND.EVENT 2@wrap42 OSTP/2.0
Device:BT-00:10:03:35:47:88

The first example shows the message sent by a service point when it has discovered the device in wireless LAN infrastructure. The service point it is indicated by a session which is kept between service point and connectivity server.

The Device attribute specific the MAC Layer2 address of the device. The BSSID specifies the WLAN Access point identifier (actually MAC-address).

For Bluetooth the message is similar but the since the service point is also the access point no BSSID is provided in the message. The device address starts with BT for Bluetooth and WL for WLAN case.

Figure 3:
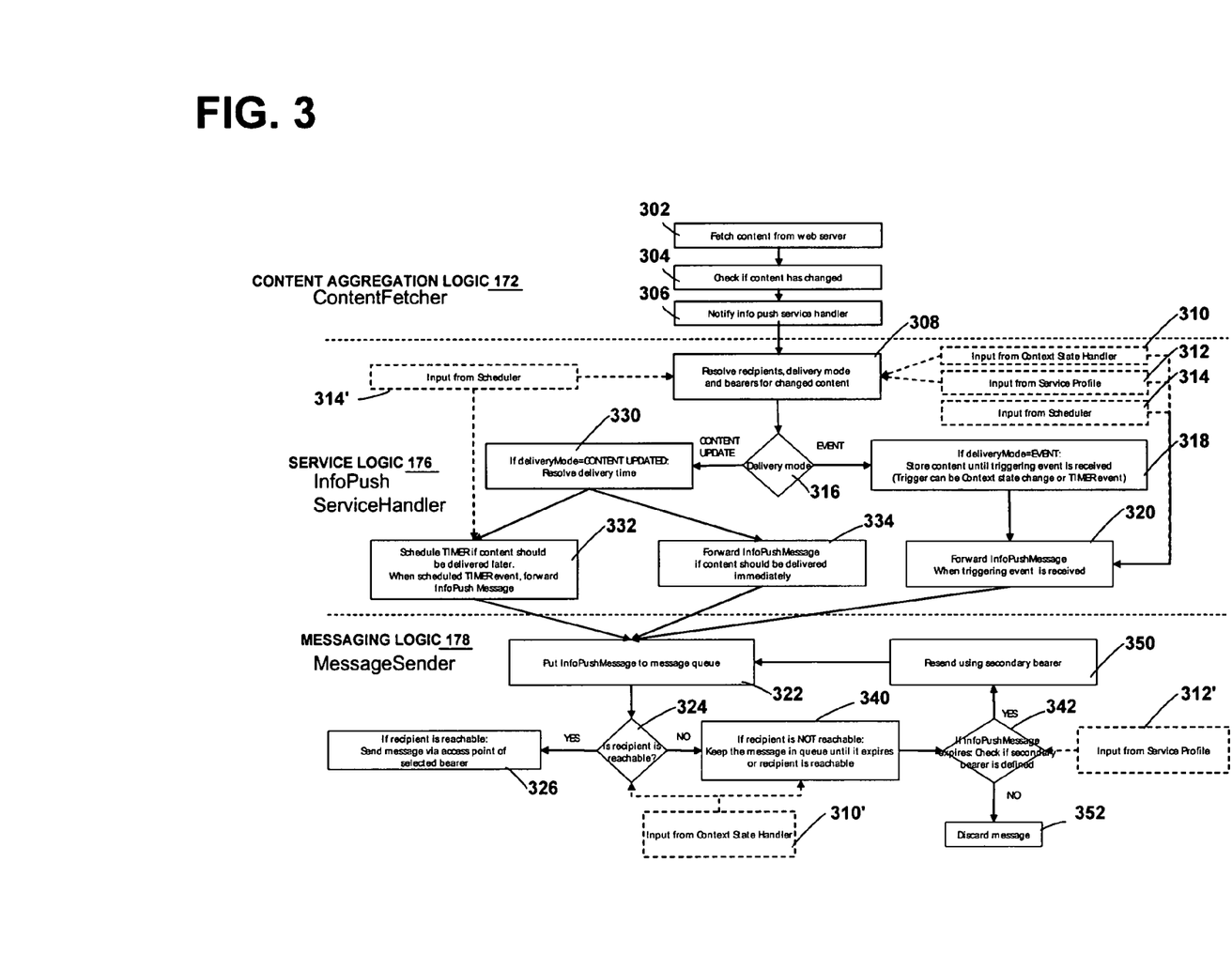
FIG. 3 is a flow diagram according to an embodiment of the present invention.

FIG. 3, one embodiment of the present invention, is a flow diagram of the operation of the Service Manager 170, comprising the Content Aggregation Logic 172, also referred to herein as the Content Fetcher 172, the Service Logic 176, also referred to as the InfoPush Service Handler 176, and the Messaging Logic 178, also referred to herein as the Message Sender 178, in transferring service message information from content sources to mobile devices. The flow diagram of FIG. 3 represents a computer program and the steps of the flow diagram represent programmed instructions of the computer program that, when executed by a computer program processor, carries out the functions of the invention.

In the Content Aggregation Logic 172, also referred to herein as the Content Fetcher 172 in FIG. 3, step 302 fetches content from the web servers 190. Step 304 checks and/or recognizes if the content has changed, updated, or if it is new. Step 306 then notifies the InfoPush Service Handler 176 of changed or new content.

In the Service Logic 176, also referred to as the InfoPush Service Handler 176 in FIG. 3, step 308 resolves recipients, delivery mode, and bearers for changed or new content. Step 310 provides input from the context state handler 174. Step 312 provides input from Service Profile Server 204. Step 314 provides input from the scheduler 206. Step 308 flows to the decision step 316 to determine the delivery mode. If the mode is an event, then the process flows to step 318 to store the content until a triggering event is received (the trigger can be a context state change or a timer event.) Step 320 then forwards the information push message to the message sender 178 when a triggering event is received. The triggering event may be immediate delivery.

In the Messaging Logic 178, also referred to herein as the Message Sender 178 in FIG. 3, step 322 then puts the information push message into the message queue 208. Step 322 flows to the decision step 324 to determine if the recipient is reachable. If so, then step 326 sends the message via the selected bearer. If the selected bearer is the Bluetooth or Wireless LAN network in coverage area 150, then the access point 140 is used to send the message to the mobile device 100. If the selected bearer is the GSM telephone network, then the GSM access point 186 is used to send the message to the mobile device 100 in the GSM coverage area 180.

If the decision step 324 of FIG. 3 determines that the recipient is not reachable, then the process flows to step 340 to keep the message in the content queue 205 until the message expires or until the recipient becomes reachable. Step 310' provides input from the context state handler 174. Step 340 then flows to the decision step 342 to determine if a secondary bearer has been defined in the event that the information push message expires. Step 312' provides an input from the Service Profile Server 204. If a secondary bearer has been defined, then the process flows to step 350 to resend the message using the secondary bearer. Step 350 flows back to step 322 to put the information push message into the message queue 208.

If decision step 342 of FIG. 3 determines that no secondary bearer has been defined, then step 352 discards the message.

Back in the InfoPush Service Handler 176 of FIG. 3, if the decision step 316 determines that the delivery mode is a content update, then the process flows to step 330 to resolve the delivery time. Then step 330 flows to either step 332 or to step 334. Step 332 schedules the timer if content is specified by the service profile to be delivered later. When a scheduled timer event occurs, then the information push message is forwarded. Step 314' provides input from scheduler 206. Instead, if step 330 flows to step 334, the information push message is forwarded if the content is specified by the service profile to be delivered immediately. Both step 332 and step 334 flow to step 322 to put the information push message into the message queue 208.

Figure 4:
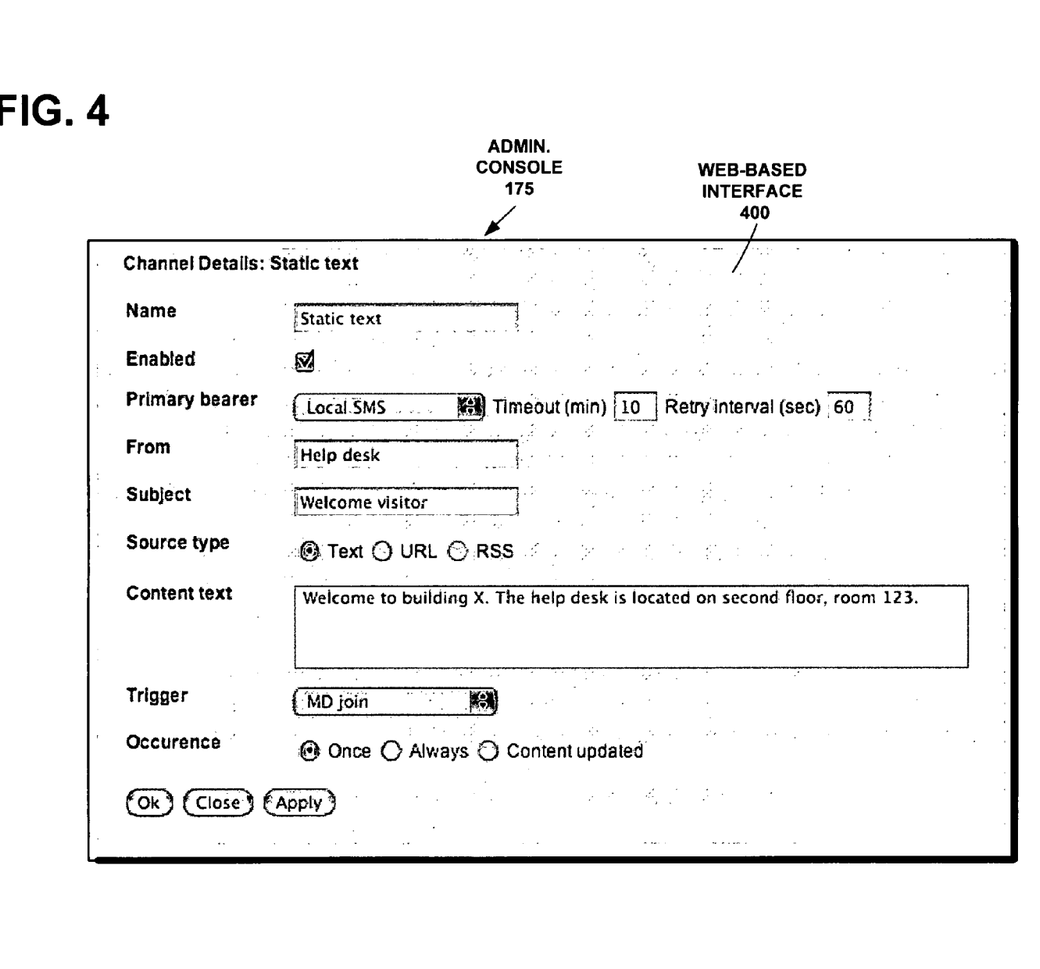
FIG. 4 is a first screen shot of the administrator's web-based user interface according to an embodiment of the present invention.
Figure 5:
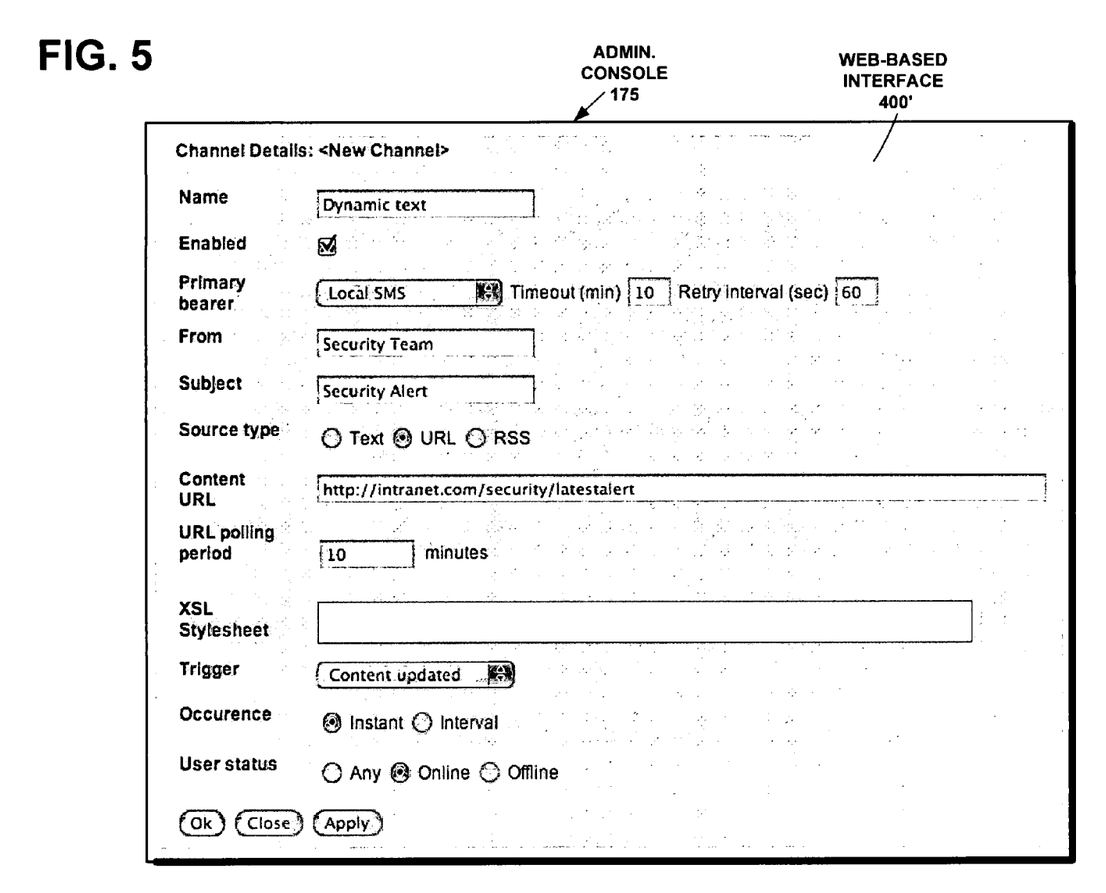
FIG. 5 is a second screen shot of the administrator's web-based user interface according to an embodiment of the present invention.
Figure 6:
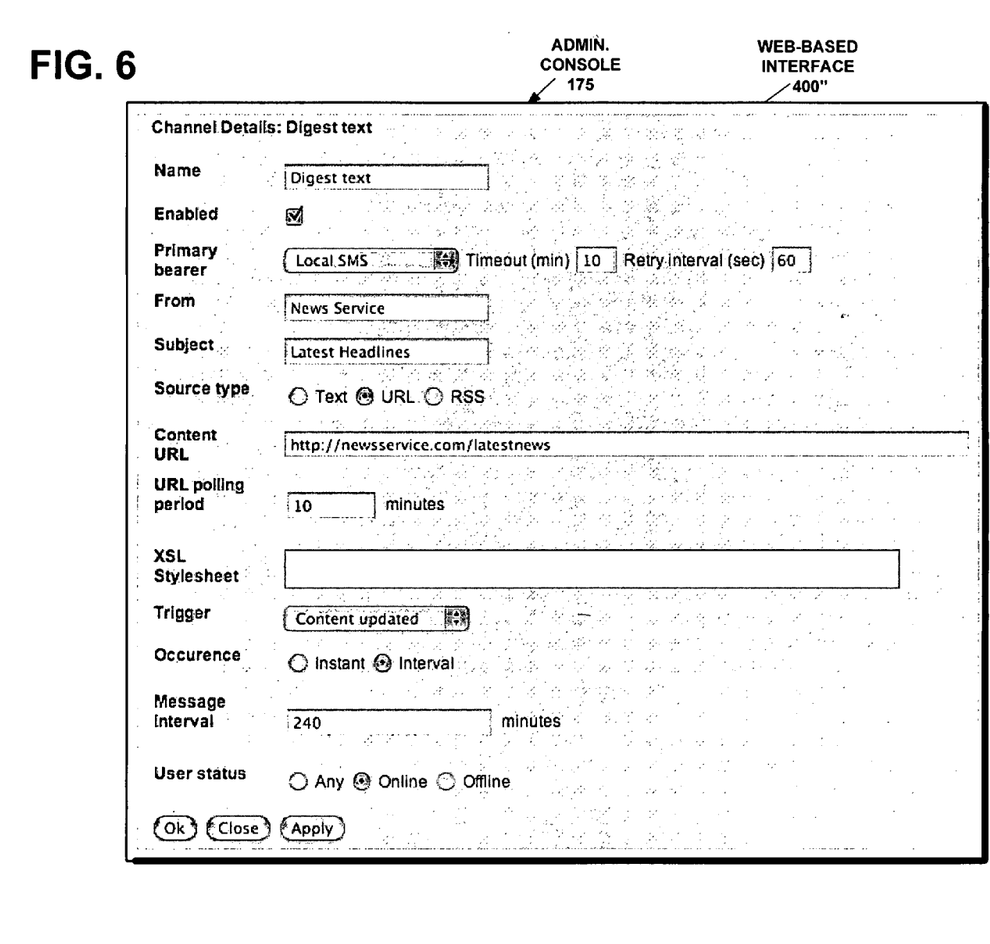
FIG. 6 is a third screen shot of the administrator's web-based user interface according to an embodiment of the present invention.

FIGS. 4, 5, and 6, one embodiments of the present invention, depict the web-based administrator's interfaces 400, 400', and 400" that enable the administrator to configure information push services step-by-step for the following use cases.

FIG. 4 shows a screen shot of an administrator's interface 400 implemented as a web page on the administrator's console 175, configured to enable an administrator to send messages that contain static text, which can be typed in by the administrator. For example, a static welcome message: "Welcome to building X. Help desk can be found at floor 1, room 123". Only relevant input fields for each use case are shown at a time. The message may contain information in a map format so that when a user is visiting a new office building he will get information in a map format to find the entrance. The map may be different depending on the service point.

FIG. 5 shows a screen shot of an administrator's interface 400' implemented as a web page on the administrator's console 175, configured to enable an administrator to specify dynamic messages to be sent whose content is fetched from an Internet or intranet content web page server 190. The interface 400' contains text string (e.g. "security alert") that needs to be completely sent to the user's mobile device 100. When the content page is updated, the old text is replaced with new. The content source is specified with a URL. If the content is in XML-format, it can be formatted to text using an XSLT-stylesheet. Whenever the content specified by the interface 400' is changed, a new message is created, meaning that users should get one message per content change. The messages are queued on the server 205 until the user comes online in the local coverage of an access point 140 and the messages are then sent to the mobile device 100 to ensure that the user gets all information that has been updated while the user was offline. For example, content of a security alert web page specified by interface 400' can be sent to user's device 100 every time it is updated. It is important that the user's device 100 gets all alerts even if he has been away for a while.

FIG. 6 shows a screen shot of an administrator's interface 400" implemented as a web page on the administrator's console 175, configured to enable an administrator to specify dynamic digest messages to be sent whose content is fetched from an Internet or intranet web page servers 190. In this use case, the interface 400" contains a list of items (e.g. news headings) instead of one, and new items are added to the top of list, thus rolling the older items downwards. With this type of content, it is not necessary to send any intermittent versions of the page, but only the newest version, which contains also the older items. Whenever a user's mobile device 100 comes online, a message is generated from the current web page version. It is possible to specify the minimum time period between messages, e.g. the web page may be updated with a new item once per hour, but users get updates only once per day. As an alternative, it is possible to specify the times of day (e.g. after 8:00, 12:00, and 16:00) after the users get updated information.

System Overview

The system may be a bridge between existing office or enterprise applications and servers to mobile devices such as mobile phones, smart phones, and other similar devices. The mobile devices communicate wirelessly with Nokia Service Points via Bluetooth and WLAN. The Service Points detect the presence of registered mobile devices in the coverage area and enable the mobile device users to access existing office or enterprise applications. The system uses a centralized Connectivity Server as the interface between the Service Points and the office/enterprise application servers. A Service Point, upon detecting a mobile device in its coverage area, receives the mobile device ID and transmits it to the Connectivity Server for authentication. The Service Point does not transmit any location information of itself or the mobile device to the Connectivity Server upon detection of the mobile device.

The "Access Points" in the System

The system uses a plurality of "multiradio Service Point[s] for connecting the mobile device to backend services." The registered user is detected and authenticated when arriving in the Service Point coverage area. The Nokia Service Point has "Bluetooth, WLAN, LAN, and optionally also GPRS or SMS connectivity.

The Service Points do not attempt to identify the mobile device or user, but merely transmit the mobile device's identifier to a Service Manager. As can be seen the Service Manager is the interface to the existing enterprise applications and servers. The Service Manager provides the Connectivity Server with static persistent data on authorized service points, provisioned mobile devices, users and services.

The following shows what happens when a mobile device enters a coverage area of a Service Point:
  Mobile Device Joins the service
  Actors: Mobile device, Service Point, Connectivity Server, Manager, External
  Application
  Precondition:
  End-user and mobile device have been provisioned to system
  Service point has established a connection to connectivity server
  Connectivity server has already fetched service profiles from the Service Manager
  Post condition
  Mobile device has been assigned to a first service point that discovered it
  Description
  Mobile Device arrives to one or more Service Points' coverage
  One or multiple service points discover the mobile device
  Service points send register mobile device message to connectivity server
  Connectivity server fetches user profile from the Service Manager and authenticates the user Connectivity server responses to first service point by sending assign message, which commands service point to join with the mobile device Service point acknowledges that the mobile device has joined with the service point This shows that the Service Point sends the Connectivity Server a message so that the Connectivity Server may authenticate the user.

Three scenarios—connectivity via Bluetooth where the Service Point initiates contact with the mobile device, connectivity via Bluetooth where the mobile device initiates contact with the Service Point, and connectivity via WLAN. It may be seen that all communications from the Service Points are directed to the Connectivity Server and the Service Manager, and the Connectivity Server authenticates the user using the mobile device's device ID such as its MAC address.

Although specific embodiments of the invention have been disclosed, a person skilled in the art will understand that changes can be made to the specific embodiments without departing from the spirit and scope of the invention.

What is claimed is:

1. A system for content delivery to a one or more mobile wireless devices, comprising:
   at least one service profile specifying content delivery characteristics for one or a plurality of mobile wireless devices, the at least one profile including a recipient characteristic, a message delivery mode characteristic, and a bearer characteristic;
   one or a plurality of wireless access points distributed in a network; and
   a service manager coupled to the one or plurality of access points, for pushing content via a specified bearer, using a specified delivery mode, to one of the plurality of mobile wireless devices of a specified recipient satisfying one of the defined profiles of content delivery characteristics when the one mobile wireless device is located within a coverage area of one of the plurality of access points.

2. The system of claim 1, which further comprises:
   a service profile server coupled to the interface for storing the service profiles, the profiles including a content characteristic;
   a content aggregation logic coupled to the service profile server, for polling content servers identified by the content characteristic in a service profile, and recognizing content from the content servers.

3. The system of claim 2, which further comprises:
   a service logic coupled to the content aggregation logic, the content queue, and the service profile server, for receiving a notification that content has been recognized and handling the recognized content in accordance with the service profiles in the service profile server.

4. The system of claim 3, which further comprises:
   a context state logic coupled to the service logic and to the plurality of access points, for maintaining context information about the one or more-mobile wireless devices, including whether a specified mobile device can be reached over a communications link.

5. The system of claim 4, which further comprises:
   said service logic determining a delivery mode of the recognized content for the specified mobile device;
   said service logic storing the recognized content until a triggering event if the delivery mode specified by the service profile is a specified event, and forwarding the recognized content as a push content to a messaging logic when the specified event occurs;
   said service logic resolving a delivery time for the recognized content if the delivery mode specified by the service profile is that the content has been updated, and forwarding the recognized content as a push content to a messaging logic either when a scheduled timer event occurs or immediately, depending on the service profile.

6. The system of claim 5, which further comprises:
   said messaging logic being coupled to the context state logic for selecting a specified primary bearer to send the push content to the specified mobile device if the specified mobile device can be reached over the primary bearer;
   said messaging logic selecting a specified alternate bearer to send the push content to the specified mobile device if the specified mobile device cannot be reached over the primary bearer and can be reached over the alternate bearer.

7. The system of claim 6, which further comprises:
   said primary bearer being selected from the group consisting of said wireless access points and a wireless telephone communications network;
   said secondary bearer being selected from the group consisting of said wireless access points and a wireless telephone communications network.

8. The system of claim 1, which further comprises:
   said service profiles including specifications selected from the group consisting of type of content, name of services, subject of services, update or occurrence intervals, update of context, preferable bearer, and alternate bearers.

9. The system of claim 1, which further comprises:
   an interface for defining at least one service profile being drawn from the group consisting interfaces configured to enable an administrator to send messages that contain static content, interfaces configured to enable an administrator to specify dynamic content to be sent whose content is fetched from an Internet or intranet content web page server, and interfaces configured to enable an administrator to specify dynamic digest content to be sent whose content is fetched from an Internet or intranet web page server.

10. The system of claim 1, which further comprises:
    said content having a format drawn from the group consisting of SMS messages, MMS messages, and emails.

11. A service manager server for content delivery to a plurality of mobile wireless devices, comprising:
    a service profile server for storing a plurality of service profiles of content delivery characteristics, the profiles each specifying a bearer, using a specified delivery mode, for pushing a message to one of a plurality of mobile wireless devices of a specified recipient satisfying one of the plurality of service profiles when the one mobile wireless device is located within a coverage area of one of a plurality of access points;
    a content aggregation logic coupled to the service profile server, for polling web servers identified by a content characteristic in a service profile, accessing content from the web servers, and storing the content in a content queue;
    a service logic coupled to the content aggregation logic, the content queue, and the service profile server, for receiving a notification that content has been accessed and handling the accessed content in accordance with the service profiles in the service profile server;
    a context state logic coupled to the service logic and to the plurality of access points, for maintaining context information about the plurality of mobile wireless devices, including whether a specified mobile device can be reached over a communications link; and a messaging logic coupled to the context state logic for selecting a specified primary bearer to send the push message to the specified mobile device if the specified mobile device can be reached over the primary bearer.

12. The server of claim 11, which further comprises:

said messaging logic selecting a specified alternate bearer to send the push message to the specified mobile device if the specified mobile device cannot be reached over the primary bearer and can be reached over the alternate bearer.

13. The server of claim 12, which further comprises:

said service logic determining a delivery mode of the accessed content for the specified mobile device;

said service logic storing the accessed content until a triggering event if the delivery mode specified by the service profile is a specified event, and forwarding the accessed content as a push message to a messaging logic when the specified event occurs;

said service logic resolving a delivery time for the accessed content if the delivery mode specified by the service profile is that the content has been updated, and forwarding the accessed content as a push message to a messaging logic either when a scheduled timer event occurs or immediately, depending on the service profile.

14. The server of claim 13, which further comprises:

said primary bearer being selected from the group consisting of said wireless access points and a wireless telephone communications network;

said secondary bearer being selected from the group consisting of said wireless access points and a wireless telephone communications network.

15. The server of claim 11, which further comprises:

said service profiles including specifications selected from the group consisting of type of content, name of services, subject of services, update or occurrence intervals, update of context, preferable bearer, and alternate bearers.

16. The server of claim 11, which further comprises:

said message having a format drawn from the group consisting of SMS messages, MMS messages, and emails.

17. A method for content delivery to a plurality of mobile wireless devices, comprising:

storing a plurality of service profiles of content delivery characteristics, the profiles each specifying a bearer, using a specified delivery mode, for pushing a message to one of a plurality of mobile wireless devices of a specified recipient satisfying one of the plurality of service profiles when the one mobile wireless device is located within a coverage area of one of a plurality of access points;

polling web servers identified by a content characteristic in a service profile, accessing content from the web servers, and storing the content;

receiving a notification that content has been accessed and handling the accessed content in accordance with the service profiles;

maintaining context information about the plurality of mobile wireless devices, including whether a specified mobile device can be reached over a communications link; and selecting a specified primary bearer to send the push message to the specified mobile device if the specified mobile device can be reached over the primary bearer.

18. The method of claim 17, which further comprises:

selecting a specified alternate bearer to send the push message to the specified mobile device if the specified mobile device cannot be reached over the primary bearer and can be reached over the alternate bearer.

19. The method of claim 18, which further comprises:

determining a delivery mode of the accessed content for the specified mobile device;

storing the accessed content until a triggering event if the delivery mode specified by the service profile is a specified event, and forwarding the accessed content as a push message when the specified event occurs;

resolving a delivery time for the accessed content if the delivery mode specified by the service profile is that the content has been updated, and forwarding the accessed content as a push message either when a scheduled timer event occurs or immediately, depending on the service profile.

20. The method of claim 19, which further comprises:

said primary bearer being selected from the group consisting of said wireless access points and a wireless telephone communications network;

said secondary bearer being selected from the group consisting of said wireless access points and a wireless telephone communications network.

21. The method of claim 17, which further comprises:

said service profiles including specifications selected from the group consisting of type of content, name of services, subject of services, update or occurrence intervals, update of context, preferable bearer, and alternate bearers.

22. The method of claim 17, which further comprises:

said message having a format drawn from the group consisting of SMS messages, MMS messages, and emails.

* * * * *